H. ROSENBERG.
DAMPER.
APPLICATION FILED AUG. 30, 1913.
1,096,563.
Patented May 12, 1914.
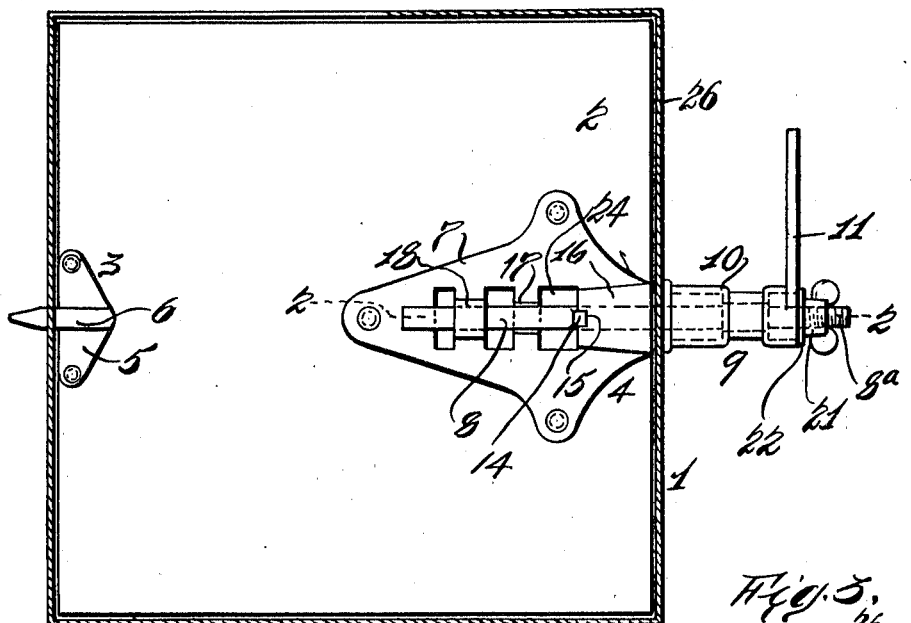
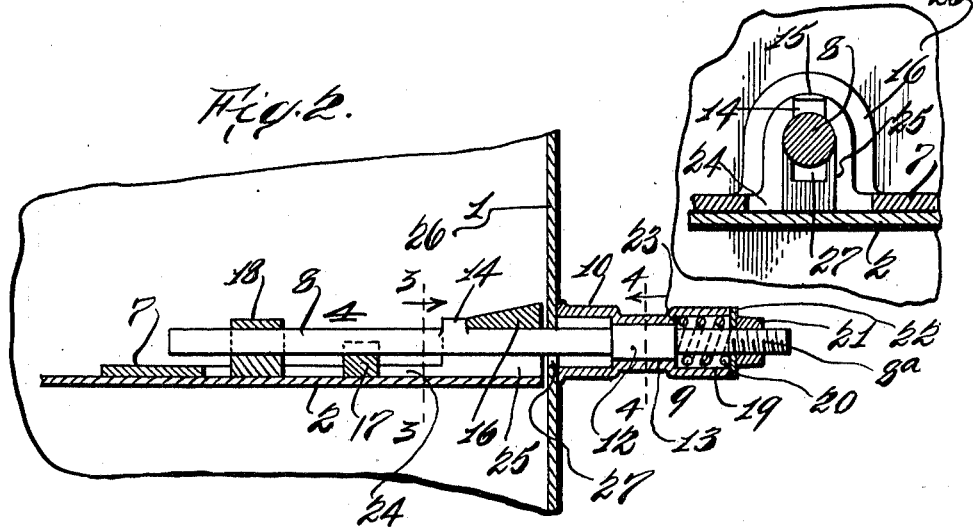
Witnesses
E. A. Jarvis
Ruth Meyers
Inventor
Heyman Rosenberg
by Maurice Block
attorney.

UNITED STATES PATENT OFFICE.

HEYMAN ROSENBERG, OF NEW YORK, N. Y., ASSIGNOR TO PARKER SUPPLY COMPANY, OF NEW YORK, N. Y., A CORPORATION OF NEW YORK.

DAMPER.

1,096,563. Specification of Letters Patent. Patented May 12, 1914.

Application filed August 30, 1913. Serial No. 787,439.

*To all whom it may concern:*

Be it known that I, HEYMAN ROSENBERG, a citizen of the United States of America, residing at New York city, borough of the Bronx, county and State of New York, have invented certain new and useful Improvements in Dampers, of which the following is a full, clear, and exact description.

This invention relates generally to an improvement in dampers, but more particularly to the handle and spindle portion thereof which, in combination, form one of the pivot-points, and lock for the damper proper.

The chief object of my invention is to provide a handle which, together with other elements, is adapted to lock or hold the damper in any adjusted position. In combination with the handle, I prefer to employ a spindle which is removably supported in position on the damper proper.

I will now proceed to describe my invention in detail, the novel features of which will be pointed out in the appended claims, reference being had to the accompanying drawing, forming part hereof, wherein:—

Figure 1 is a sectional view of a duct provided with a damper made in accordance with my improvement; Fig. 2 is an enlarged vertical sectional view thereof, the section being taken on a line 2—2 in Fig. 1; Fig. 3 is an enlarged cross-sectional detail view, the section being taken on a line 3—3 in Fig. 2; and Fig. 4 is a similar view taken on a line 4—4 in Fig. 2.

In the drawing a section of a duct is indicated by the numeral 1, said duct being provided with a damper 2. To adapt the damper to be rotated within the duct, I provide the same with pivoting elements 3 and 4. The pivoting element 3 consists of a plate 5 carrying a pin 6 which passes loosely through the adjacent wall of the duct 1. The pivoting element 4 consists of a plate 7 carrying a removable spindle 8. The spindle 8 passes loosely through the adjacent wall of the duct and projects beyond the same sufficiently to carry a handle 9 consisting of a hub 10 and arm 11. The function of the handle 9 is to rotate the damper 2 and to assist in locking or binding the same in an adjusted position. In order that the handle can rotate the damper, I provide the spindle 8 with a squared portion 12 which engages a square opening 13 in the hub 10 of the handle. In order that the spindle 8 can rotate the damper 2, I provide the same with a lug 14 which is adapted to releasably engage a recess 15 in the lug 16 on the plate 7. The spindle 8 is further supported in position by means of a bearing 17 and lug 18 through which the said spindle passes. By referring to Fig. 2 it will be seen that the hub 10 of the handle is counterbored, as at 19, to receive a spring 20 which is placed under tension by means of a wing-nut 21 engaging the threaded end 8ª of the spindle 8. The inner end of the spring 20 bears against the shoulder 23 of the counterbore 19. A washer 22 is interposed between the outer end of the spring 20 and wing nut 21.

It will be seen by referring to Figs. 2 and 3 that the spindle-support or plate 7 is provided with an opening 24 which communicates with a slot 25 extending the length of the lug 16. The spindle 8 is supported in the upper end of the said slot 25, as shown in Fig. 3. It will also be seen by referring to Fig. 3, that the wall 26 of the duct is provided with a slot 27 alining with the slot 25 in the lug 16.

When the handle is in position on the spindle and the wing-nut 21 screwed home, as shown in Fig. 2, the spring 20 will exert pressure outwardly against the wing-nut and inwardly against the hub 10, which pressure will force the said hub inwardly against the wall 26 and the spindle 8 outwardly. The outward pressure upon the spindle will keep the key or lug 14 in engagement with the recess 15, while the wing-nut is being screwed home; hence the damper can be rotated. The pressure of the spring upon the hub 10 will, as has been stated, force the said hub against the duct, thus acting as a frictional stop for the damper. When the damper has been set in desired position, the wing-nut is tightened so as to firmly lock the damper in such position. To take out the spindle 8, in order that the damper 2 can be removed, the wing-nut, spring and handle will be removed, at which time the spindle can be pushed inwardly, to clear the lug 16, and then given a half turn to bring the lug or key 14 into alinement with the slots, 25 and 27, whereupon the spindle can be pulled out. While the damper may be removed, after the spindle 8 has been taken out, the above described construction is intended more particularly to facilitate prompt assembling of the device in ducts, etc.

Having now described my invention, what I claim and desire to secure by Letters Patent is:

1. A damper, in combination with a spindle fitting into the same, a handle having a hub which receives and engages said spindle but permits independent endwise movement of the latter, a spring within said hub, tending to force it inward against the wall of a duct for braking action and also acting on said spindle to move it outward, means for limiting the outward movement of said spindle and manually operated means, independent of said spring, for forcing said hub inward at will.

2. A damper, in combination with a spindle fitting into the same, and having a screw threaded end, a handle having a hub which receives and engages said spindle but permits independent endwise movement of the latter, a spring within said hub tending to force it inward against the wall of a duct for braking action and also acting on said spindle to move it outward, means for limiting the outward movement of said spindle and a nut engaging the screw-threaded end of said spindle for forcing said hub inward at will.

3. A damper, a lug carried thereby provided with a recess, a spindle passing through said lug provided with a threaded end, a key carried by said spindle adapted to releasably engage said recess, said spindle having a squared portion, in combination with a handle consisting of a hub having a square opening adapted to engage the squared portion of said spindle, and a wing-nut carried by the spindle, at the threaded end thereof, adapted to force said handle against the wall of a duct.

4. A damper, a lug carried thereby provided with a recess, a spindle passing through said lug provided with a threaded end, a key carried by said spindle adapted to releasably engage said recess, said spindle having a squared portion, in combination with a handle consisting of a hub having a square opening adapted to engage the squared portion of said spindle, said hub being also provided with a counter-bore, surrounding said spindle, a spring in said counter-bore, and a wing-nut carried by the spindle at the threaded end thereof, adapted to compress said spring against said hub and to force said hub against the wall of a duct.

5. A damper, a lug carried thereby, a spindle passing through said lug, the spindle having a squared portion and threaded end, in combination with a handle consisting of a hub having a square opening engaging the squared portion of the spindle, and a wing-nut carried by the spindle, at the threaded end thereof, adapted to force the handle inwardly.

Signed at New York city, N. Y., this 27 day of August, 1913.

HEYMAN ROSENBERG.

Witnesses:
EDWARD A. JARVIS,
RUTH MEYERS.